(12) United States Patent
Redmond

(10) Patent No.: US 6,402,165 B1
(45) Date of Patent: Jun. 11, 2002

(54) ILLUMINATED RIDING TOY

(76) Inventor: Pamela W. Redmond, P.O. Box 169, Topping, VA (US) 23169

( * ) Notice: Subject to any disclaimer, the term of this patent is extended or adjusted under 35 U.S.C. 154(b) by 0 days.

(21) Appl. No.: 09/512,759

(22) Filed: Feb. 25, 2000

(51) Int. Cl.[7] ............................................. B62B 9/99
(52) U.S. Cl. .................. 280/18.1; 280/809; 280/845; 280/11.203
(58) Field of Search .................... 280/18.1, 18, 845, 280/809, 11.203; 446/219; 362/485, 467, 469, 459, 495, 505, 339

(56) References Cited

U.S. PATENT DOCUMENTS

| | | | | |
|---|---|---|---|---|
| 357,132 A | * | 2/1887 | Putnam, Jr. ................... | 280/18 |
| 2,493,315 A | * | 1/1950 | Ruka ........................... | 280/18.2 |
| 2,717,159 A | * | 9/1955 | Thomas ....................... | 280/845 |
| 4,194,753 A | * | 3/1980 | Schrishuhn, Jr. ............ | 280/13 |
| 4,204,357 A | * | 5/1980 | Harrington .................. | 446/47 |
| 4,231,077 A | | 10/1980 | Joyce et al. ................. | 262/32 |
| 4,367,515 A | * | 1/1983 | Beard .......................... | 362/103 |
| 4,715,564 A | | 12/1987 | Kinn et al. ............... | 244/153 R |
| 4,991,066 A | * | 2/1991 | McCowan ................... | 362/464 |
| 5,108,340 A | * | 4/1992 | Farrow ........................ | 446/242 |
| 5,132,883 A | * | 7/1992 | La Lumandier ............ | 362/466 |
| 5,138,535 A | | 8/1992 | Aragon, Jr. ................. | 362/102 |
| 5,327,329 A | * | 7/1994 | Stiles .......................... | 362/545 |
| 5,356,329 A | | 10/1994 | Thornell ..................... | 446/485 |
| 5,411,429 A | | 5/1995 | Klawiter ..................... | 446/242 |
| 5,598,065 A | | 1/1997 | Lakosky ....................... | 315/77 |
| 5,716,119 A | * | 2/1998 | Patel ........................... | 362/551 |
| 5,921,653 A | * | 7/1999 | Chien .......................... | 362/103 |
| 6,000,721 A | * | 12/1999 | Pfaeffle ................. | 280/11.203 |

* cited by examiner

*Primary Examiner*—J. J. Swann
*Assistant Examiner*—James S. McClellan
(74) *Attorney, Agent, or Firm*—Millen, White, Zelano & Branigan, P.C.

(57) ABSTRACT

A sliding toy with a visible and pleasing display of lights is disclosed. The source of light is disposed within a structural body part and supplied with a power source and control unit, such that a user may select various light displays, or that the lights may be actuated in response to physical stimuli such as bouncing, sliding, turning, or the like.

1 Claim, 5 Drawing Sheets

ILLUMINATED RIDING TOY

BACKGROUND OF THE INVENTION

1. Field of the Invention

The present invention relates to riding toys, in particular sliding riding toys which are useful for entertaining children, with the provision of lights thereon to enhance the visibility and enjoyment of riders and spectators.

2. Description of the Related Art

Multiple riding toys are well known in the prior art. Sleds, toboggans, sliding discs, even hospital trays have been used to provide a ride for amusement purposes.

More complicated riding toys exist, e.g. battery powered toy cars, trains, trucks, etc; gas powered go-carts; as well as wave-riding vehicles; miniature 4×4's; snowmobiles; and bicycles, to name a few.

It is known to mount lights upon vehicles to improve their visibility; see e.g. U.S. Pat. No. 5,598,065 which discloses a lighting system for snowmobiles and the like. It is further known to provide lighting systems to various toys, e.g. a baby rattle (U.S. Pat. No. 5,138,535), a rocking toy (U.S. Pat. No. 5,356,329); a wheeled toy (U.S. Pat. No. 5,411,429); a chemiluminescent kite (U.S. Pat. No. 4,715,564); and to use lights themselves as a toy (U.S. Pat. No. 4,231,077). Various footwear are available with lights configured to blink when a wearer steps down upon them, and bicycle headlamps, tail lamps, and generators have been available for many years.

However, none of these toys provides for increased visibility and enjoyment of a sliding toy, such as a sled, toboggan, or disc, as such toys are usually designed for lightness of weight and a simplicity of construction. Applicants have developed a novel lighting system which is lightweight, aerodynamic, and provides a unique visual effect to improve the sliding experience.

SUMMARY OF THE INVENTION

An object of the present invention is to provide a unique lighting system for a sled, toboggan, sliding disc, or the like which provides an entertaining light show to both the rider and a spectator.

Another object of the present invention is to provide a user selectable lighting arrangement for display as the sliding toy is utilized for recreation.

An additional object of the present invention is to provide an essentially sealed light emitting apparatus as a portion of the structure of the riding toy.

A further object of the present invention is to provide a translucent or transparent member to a sliding toy which enables the rider and a spectator to simultaneously see a light display on a sliding toy.

To achieve these objectives in accordance with the present invention, the sliding toy and light arrangement of the present invention provides a light source, a supply of power, and a controller configured to reside within a structural element of the sliding toy of the present invention.

In the preferred embodiment of the present invention, the structural member of the sliding toy according to the present invention is translucent or transparent to allow the rider and a spectator to view the pleasing light.

Other objects, features, and characteristics of the present invention as well as the methods of use of related elements will become more apparent upon consideration of the following description and the appended claims with reference to the accompanying drawings, wherein like reference numbers designate corresponding elements in the various figures.

DETAILED DESCRIPTION OF THE PRESENTLY PREFERRED EMBODIMENT

Figure 1:
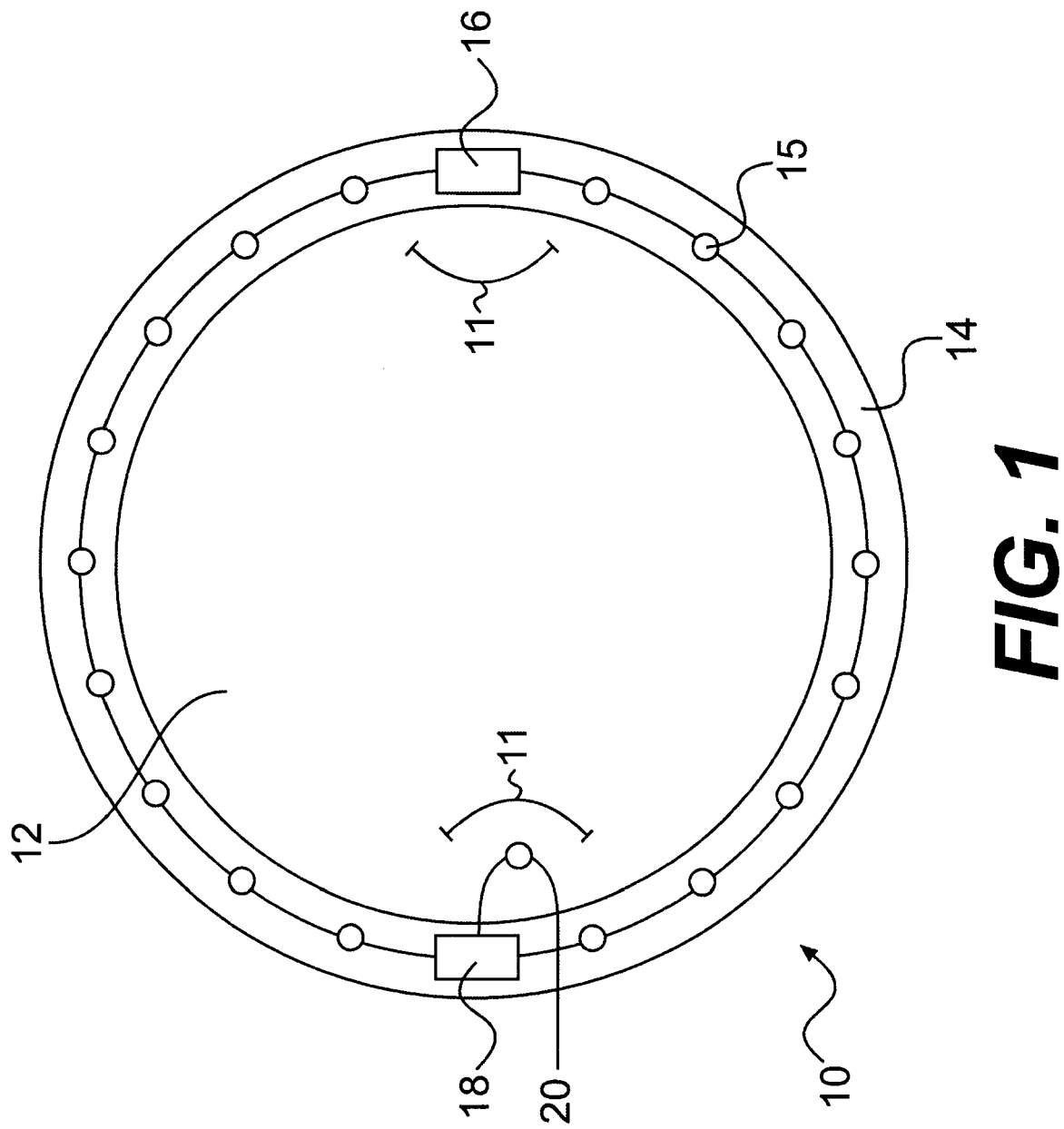
FIG. 1 is a top plan view of an exemplary sliding toy in accordance with the present invention.

As shown in FIG. 1, a preferred embodiment of a device according to the instant invention is designated generally by the reference numeral 10. In this instance illustrated, the toy is a sliding disc, useful for sliding down an incline which has a slippery material thereon, e.g. snow, ice, water, or other slippery surfaces which may be made of various synthetic materials, e.g. various known polymers (polytetrafluoroethylene (PTFE), silicone, or the like.

A pair of handles 11 are optionally provided to ensure the rider may grip the sliding toy and remain seated within. The body 12 may be formed from any rigid or semi-rigid material, a thermoplastic material for example, and be manufactured by any of several known methods, e.g. blow molding. Circumferentially disposed thereon is a light bar 14, which is essentially the outer perimeter of the sliding toy. The light bar may be blow molded as part of the body 12, or may be later mounted thereon.

The light bar may be made of any of various known materials, the currently preferred material is a transparent or translucent high-impact thermoplastic material, e.g. polyethylene, polypropylene, or other synthetic products such as resins or other materials which have sufficient mechanical strength to provide durability in an impact-prone environment, such as collisions with stationary objects such as trees, bushes, shrubs, people, or other sliding toys.

Disposed within the light bar are a plurality of lights 15. These lights are preferably impact resistant, such as light emitting diodes (LEDs) or other light emitting devices which are substantially capable of withstanding various shocks and encounters in a physical environment.

A switch device 16 is optionally provided which enables the rider to switch the lights on or off at will. In a preferred embodiment, the switch is actuated by impact, e.g. is a piezoelectric switch which causes the lights to flash upon any of various forms of acceleration, both horizontal and vertical.

Also provided is power source 18, which may be batteries, either disposable or rechargeable. In a particularly preferred embodiment, power source 18 is disposed within a sealed cavity and is rechargeable via charging port 20. Charging port 20 may have a cover to protect it from intrusion of water, snow, ice, etc. The cover may also be formed of a thermoplastic material and contain threads about its edge, which threads matingly engage corresponding threads formed about the periphery of charging port 20. The cover may also be a rubber material, e.g. a rubber bung or stopper which seals the port against inclement weather.

In preferred arrangements according to the instant invention, a control device is included, e.g. within switch 16. The control device may be a hardwired circuit which provides any of a number of patterns of pleasing light flashing.

In a particularly preferred embodiment the light bar 14 is wholly enclosed and formed as a part of the overall sliding toy, with no protrusions or extensions above the smooth surface of the sliding toy. As is illustrated in FIG. 1, a sliding disc is generally concave on its inner (riding) surface, and convex on its outer (sliding) surface. With the lights embedded within the circumferentially disposed light bar, the overall shape of the disc is not affected, such that aerodynamic drag or frictional drag is not increased by the provision of the lighting arrangement.

Figure 2:
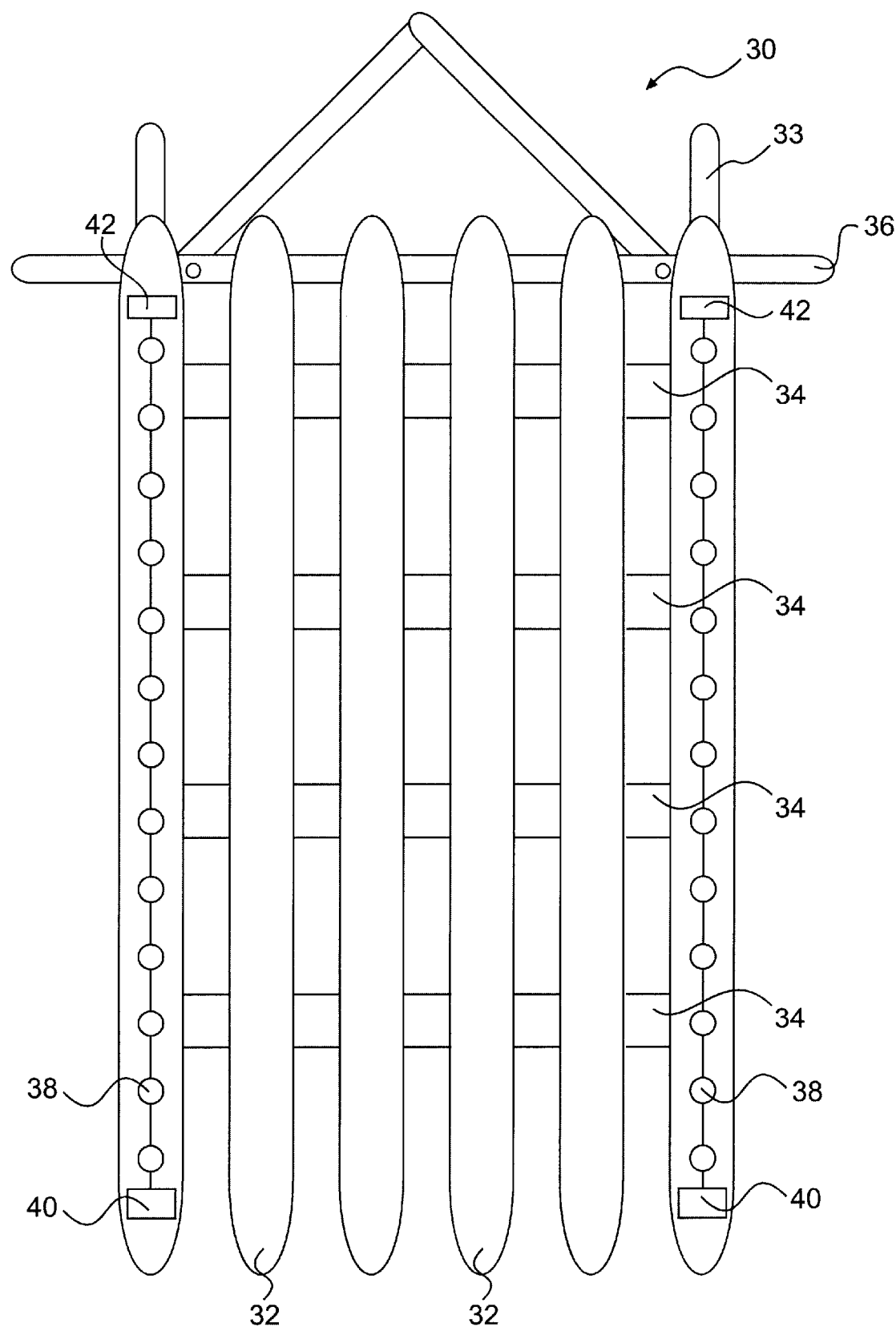
FIG. 2 is a top plan view of an exemplary sliding toy according to the present invention.

Turning now to FIG. 2, it may be seen that sliding toy 30 is a sled. The sled is formed conventionally with runners 33 there beneath which contact the snow or ice or other friction-reduced surface. The riding platform is formed from a plurality of support members 32, held together by horizontal support beams 34. The support members and horizontal support beams may be formed of any durable material, e.g. wood, plastic, metal, or the like which can support the weight of a rider. A steering device 36 is optionally provided to enable a rider to guide the path of the sliding device.

The outermost support members according to the present invention are preferably of the same thickness as the support members of the remainder of the riding platform. They contain therein a lighting arrangement according to the present invention.

Lights 38 are disposed within the outermost support members, optionally with a prismatic enhancement. Power supply 40 and control 42 are provided either to each set of lights, or one is supplied to drive each set of lights.

In a particularly preferred embodiment, control 42 contains a sensor to determine if the steering device is being utilized and actuates the lights in response thereto. Particularly preferred is when the lights are actuated on the side to which the direction of the sliding toy is changing, i.e. if a left hand turn is being attempted, then the left hand lights are actuated.

Figure 3:
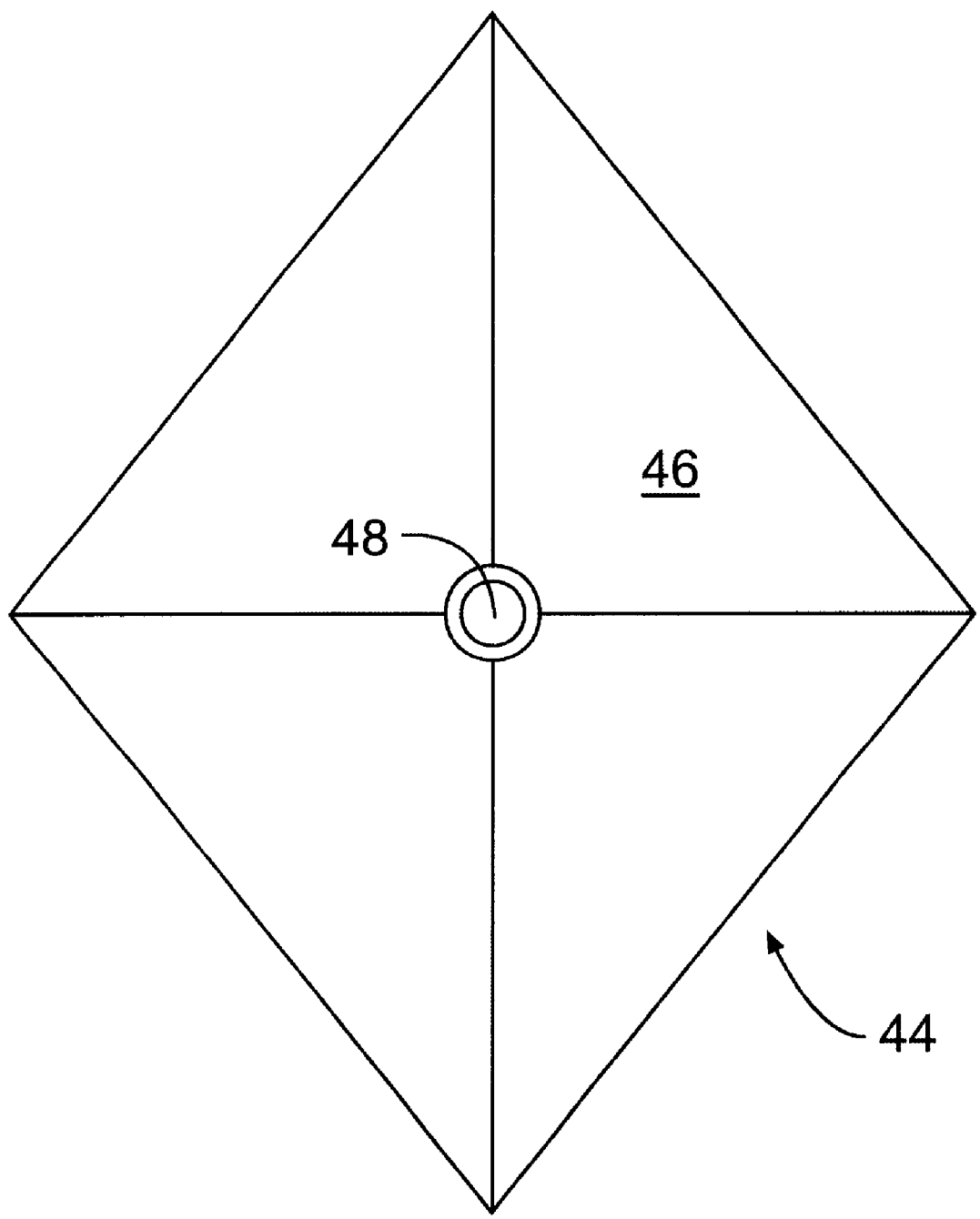
FIG. 3 is a perspective view of an exemplary light prism useful in an embodiment of the present invention.

Turning now to FIG. 3, an exemplary light-reflective enhancing prism is illustrated. As may be seen, the prism 44 has four beveled faces 46 which act to gather and reflect the light from the centrally located light fixture 48, which provides a pleasing crystalline effect.

Figure 4:
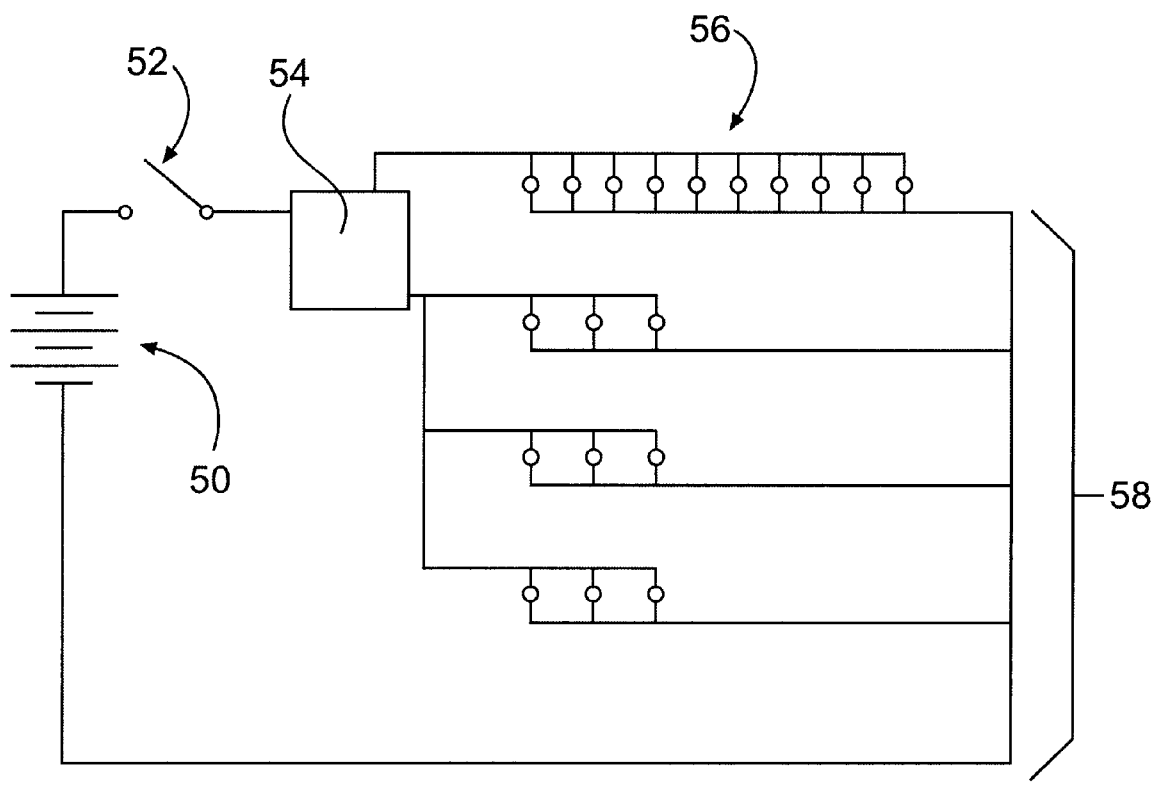
FIG. 4 is an electrical schematic diagram of a circuit useful in the instant invention.

Now referencing FIG. 4, an exemplary electrical diagram showing appropriate circuitry for an apparatus according to the present invention is illustrated. Power source 50 may be replaceable disposable batteries, or a sealed-in rechargeable unit as disclosed herein. The system is actuated by switch 52, which may be a simple on-off switch, a piezoelectric motion sensor, a mercury-type level sensor, or a directional sensor which determines the direction of the sliding toy is changing and actuates lights in response thereto.

For example, there may be magnets located in the runner beneath a reed-switch type magnetic sensor, which actuate the lights when the magnet passes close by when, e.g. the steering device is pushed to cause a directional change in the sliding toy.

A programmable control device 54 is optionally provided. This control device may be a preprogrammed chip, e.g. an eprom, or a hardwired logical circuit which performs certain flashing activities for the lights. If the lights are wired as in string 56, all the lights may be controlled to flash on and off at will. The lights may be wired according to string 58, which can cause a series of lights to flash in a repeating pattern, such as a chasing effect or the like. Optionally, each individual light may be wired separately to the control to achieve any of a nearly infinite possibility of flashing light arrangements.

Figure 5:
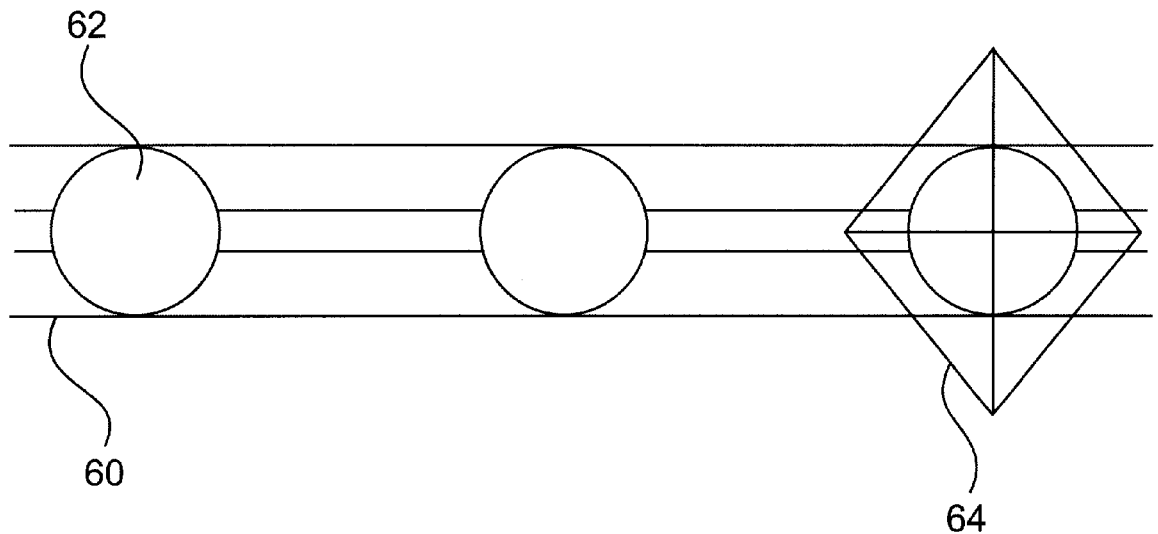
FIG. 5 is an exemplary light tube with an exemplary prism useful in a sliding toy according to the present invention.

Turning now to FIG. 5, an illustrative exemplary light tube is provided. This tube is preferably mounted along the periphery (or close to the periphery) of the sliding toy. It is basically an outer transparent or translucent component 60, in generally tubular form, within which a plurality of lights 62 are mounted and in electrical connectivity with each other, the which a plurality of lights 62 are mounted and in electrical connectivity with each other, the power source, and a controller. An optional crystalline prismatic reflector 64 is provided to enhance the light characteristics of the light tube.

It is particularly preferred that the light tube be an integrated structural component of the sliding toy. More specifically, it is preferably formed in an identical shape of a structural component such that it may be substituted for or added to a normal component without loss in sliding abilities, or increasing weight or the like.

Such components according to the present invention may be supplied as retrofit kits for existing sliding toys in order to enable those with toys to enhance their toys to achieve a pleasing light display, and also to provide improved visibility.

While the invention has been described in connection with the preferred embodiment, it should be understood readily that the present invention is not limited to the disclosed embodiment. Rather, the present invention is intended to cover various equivalent arrangements and is only limited by the claims which follow.

Having described the invention as above, I claim:

1. An illuminated sliding snow disc, comprising:

a substantially circular body having a surface area capable of carrying a passenger over snow, said body being formed with a concave interior portion and a convex exterior portion and having a translucent periphery, a source of illumination disposed within said periphery, said source of illumination comprising a plurality of lights electrically connected to a power source, a switch, and a control, the control having preprogrammed flashing arrangements, whereby the periphery of the disc is illuminated both interiorly and exteriorly by the plurality of lights.

\* \* \* \* \*